United States Patent
Sekizuka

(10) Patent No.: US 11,148,629 B2
(45) Date of Patent: Oct. 19, 2021

(54) OCCUPANT PROTECTING DEVICE FOR VEHICLE

(71) Applicant: Toyota Jidosha Kabushiki Kaisha, Toyota (JP)

(72) Inventor: Makoto Sekizuka, Toyota (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 67 days.

(21) Appl. No.: 16/663,880

(22) Filed: Oct. 25, 2019

(65) Prior Publication Data

US 2020/0130632 A1 Apr. 30, 2020

(30) Foreign Application Priority Data

Oct. 29, 2018 (JP) .............................. JP2018-202672

(51) Int. Cl.
*B60R 21/206* (2011.01)
*B60R 21/231* (2011.01)
(Continued)

(52) U.S. Cl.
CPC .......... *B60R 21/231* (2013.01); *B60R 21/205* (2013.01); *B60R 21/206* (2013.01);
(Continued)

(58) Field of Classification Search
CPC .......... B60R 21/206; B60R 2021/0046; B60R 2021/23176; B60R 2021/0051;
(Continued)

(56) References Cited

U.S. PATENT DOCUMENTS 10,525,922 B1 * 1/2020 Lin ................... B60R 21/01516
2002/0171232 A1 * 11/2002 Abe ...................... B60R 21/206
280/730.1
(Continued)

FOREIGN PATENT DOCUMENTS

JP 2004168280 A * 6/2004
JP 2005-306359 11/2005
(Continued)

OTHER PUBLICATIONS

Werner Freisler, Vehicle-Occupant Restraint System, and Method for Operating a Vehicle-Occupant Restraint System, Feb. 6, 2020, EPO, WO 2020-0025765 A1, Machine Translation of Description (Year: 2020).*

(Continued)

*Primary Examiner* — James A English
*Assistant Examiner* — Matthew D Lee
(74) *Attorney, Agent, or Firm* — Dinsmore & Shohl LLP

(57) ABSTRACT

An occupant protecting device for a vehicle has a knee airbag that is disposed at a seat front side of a vehicle seat, and that, at a time of a front collision of a vehicle, deploys, and restrains leg portions of a vehicle occupant seated in the vehicle seat. A foot airbag is disposed at the seat front side of the vehicle seat. At a time of a front collision of the vehicle, when a seat front-rear direction position of the vehicle seat is disposed further toward a rear side than a predetermined position, the foot airbag deploys between the knee airbag and the leg portions of the vehicle occupant seated in the vehicle seat, and restrains the leg portions of the vehicle occupant seated in the vehicle seat.

18 Claims, 13 Drawing Sheets

(51) Int. Cl.
*B60R 21/00* (2006.01)
*B60R 21/205* (2011.01)

(52) U.S. Cl.
CPC ............. *B60R 2021/0004* (2013.01); *B60R 2021/0032* (2013.01); *B60R 2021/0046* (2013.01); *B60R 2021/0053* (2013.01); *B60R 2021/23107* (2013.01); *B60R 2021/23169* (2013.01); *B60R 2021/23176* (2013.01)

(58) Field of Classification Search
CPC .. B60R 2021/0053; B60R 2021/23169; B60R 2021/23386; B60R 2021/0032; B60N 2/995
See application file for complete search history.

(56) References Cited

U.S. PATENT DOCUMENTS

| | | | | |
|---|---|---|---|---|
| 2004/0113399 | A1* | 6/2004 | Yoshikawa | ........... B60R 21/206 280/730.1 |
| 2005/0062265 | A1* | 3/2005 | Hotta | ................ B60R 21/206 280/730.1 |
| 2014/0027574 | A1* | 1/2014 | Obadia | ................ B60R 21/20 244/121 |
| 2015/0066308 | A1* | 3/2015 | Nagasawa | ......... B60R 21/01534 701/45 |
| 2019/0054888 | A1 | 2/2019 | Fukawatase et al. | |
| 2019/0084512 | A1 | 3/2019 | Takayanagi et al. | |
| 2020/0164827 | A1* | 5/2020 | Oh | ......................... B60R 21/04 |

FOREIGN PATENT DOCUMENTS

| | | | |
|---|---|---|---|
| JP | 2018-052347 | 4/2018 | |
| JP | 2019-043482 | 3/2019 | |
| JP | 2019-051833 | 4/2019 | |
| JP | 2019-034698 | 7/2019 | |
| WO | WO-03078206 A2 * | 9/2003 | ......... B60N 2/42736 |
| WO | WO-2020025765 A1 * | 2/2020 | ....... B60R 21/01512 |

OTHER PUBLICATIONS

Kenji Mori, Driver Protecting Airbag Device, Jun. 17, 2004, EPO, JP2004168280A, Machine Translation of Description (Year: 2004).*

* cited by examiner

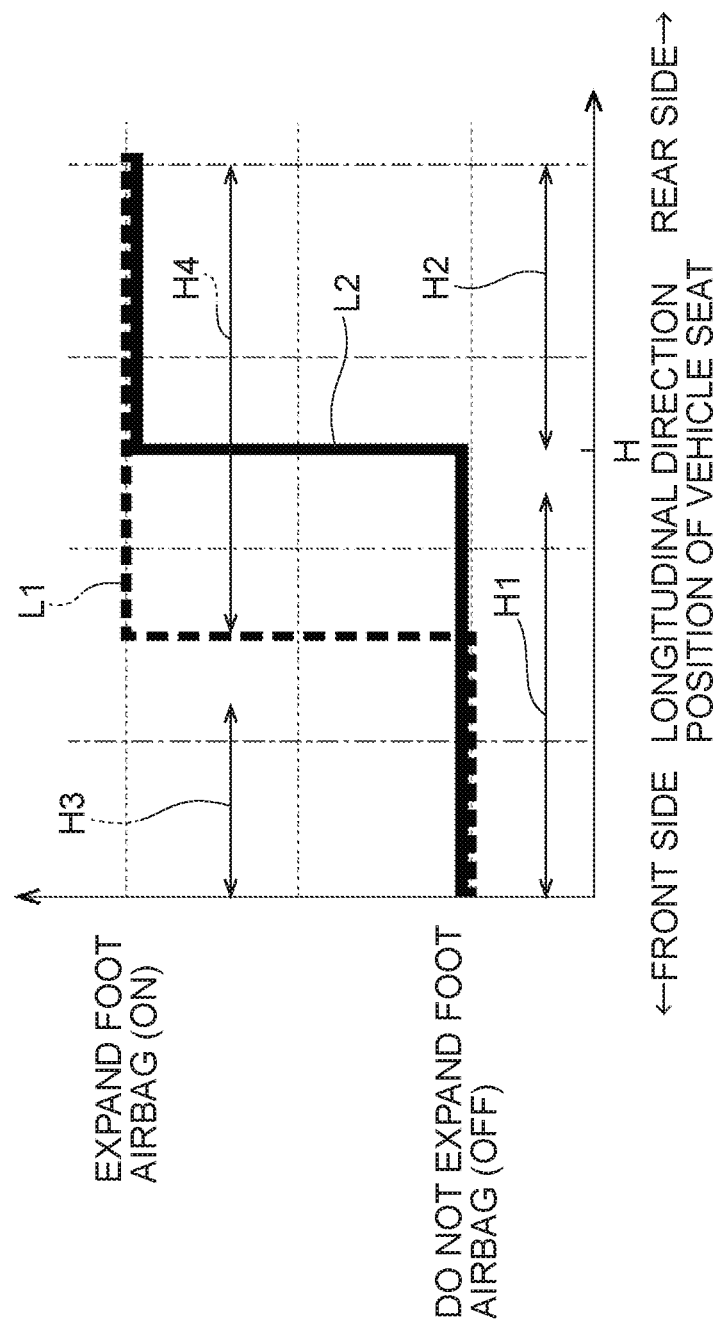

OCCUPANT PROTECTING DEVICE FOR VEHICLE

CROSS-REFERENCE TO RELATED APPLICATION

This application is based on and claims priority under 35 USC 119 from Japanese Patent Application No. 2018-202672 filed on Oct. 29, 2018, the disclosure of which is incorporated by reference herein.

BACKGROUND

Technical Field

The present disclosure relates to an occupant protecting device for a vehicle.

Related Art

Japanese Patent Application Laid-Open (JP-A) No. 2005-306359 discloses an occupant protecting device for a vehicle that has a floor airbag and a knee airbag that expand at the front side of a vehicle seat (the driver's seat or the front passenger's seat). The floor airbag is provided at the toeboard that is at the rear of the engine room, and the knee airbag is provided beneath the instrument panel. At the time when the vehicle is involved in a full-overlap collision, the knee airbag is deployed while restricting the expansion of the floor airbag. At the time when the vehicle is involved in an offset collision, the floor airbag is deployed while restricting the expansion of the knee airbag. Due thereto, at the time of a collision of the vehicle, the leg portions of the vehicle occupant not being able to move freely is suppressed, and the respective effects of the floor airbag and the knee airbag not being able to be exhibited sufficiently is suppressed.

SUMMARY

In a state in which a vehicle occupant who is seated in a vehicle seat has slid the vehicle seat toward the seat rear side in order to assume a comfortable posture for example, the space at the periphery of the leg portions of the vehicle occupant seated in the vehicle seat becomes large. Namely, the space between the leg portions of the vehicle occupant seated in the vehicle seat and the portion where the airbag (the knee airbag or the like) is provided becomes large.

Therefore, it is thought that, at the time of a front collision of the vehicle, it will be difficult for the leg portions of the vehicle occupant who is seated in the vehicle seat to be restrained by the airbag (the knee airbag or the like). However, such a case is not considered in the structure disclosed in above-described JP-A No. 2005-306359.

In view of the above-described circumstances, an object of the present disclosure is to provide an occupant protecting device for a vehicle that can restrain the leg portions of a vehicle occupant who is seated in a vehicle seat, in a state in which the vehicle seat has been slid toward the seat rear side.

An occupant protecting device for a vehicle of a first aspect of the present disclosure includes: a vehicle seat that is supported so as to be slidable in a seat front-rear direction; a first airbag that is disposed at a seat front side of the vehicle seat, and that, at a time of a front collision of a vehicle, deploys, and restrains leg portions of a vehicle occupant seated in the vehicle seat; and a second airbag that is disposed at the seat front side of the vehicle seat, and that, at a time of a front collision of the vehicle, in a case in which a seat front-rear direction position of the vehicle seat is disposed further toward a rear side than a predetermined position, deploys between the first airbag and the leg portions of the vehicle occupant seated in the vehicle seat, and restrains the leg portions of the vehicle occupant seated in the vehicle seat.

In accordance with the occupant protecting device for a vehicle of the first aspect, the first airbag deploys when the vehicle is involved in a front collision in a state in which the seat front-rear direction position of the vehicle seat is disposed further toward the front side than a predetermined position. Due thereto, the leg portions of the vehicle occupant seated in the vehicle seat are restrained by the first airbag. Further, the first airbag deploys when the vehicle is involved in a front collision in a state in which the seat longitudinal direction position of the vehicle seat is disposed further toward the rear side than the predetermined position. In addition, the second airbag deploys between the first airbag and the leg portions of the vehicle occupant seated in the vehicle seat. Due thereto, the leg portions of the vehicle occupant seated in the vehicle seat are restrained by the second airbag. In this way, in the disclosure of the first aspect, the leg portions of the vehicle occupant seated in the vehicle seat can be restrained in a state in which the vehicle seat has been slid toward the seat rear side.

In an occupant protecting device for a vehicle of a second aspect, in the occupant protecting device for a vehicle of the first aspect, sides, which are opposite the leg portions of the vehicle occupant seated in the vehicle seat, of the first airbag and the second airbag expand along inner surfaces of a cabin.

In accordance with the occupant protecting device for a vehicle of the second aspect, the sides, which are opposite the leg portions of the vehicle occupant seated in the vehicle seat, of the first airbag and the second airbag expand along inner surfaces of the cabin. Due thereto, load, which is inputted from the leg portions of the vehicle occupant seated in the vehicle seat to the first airbag and the second airbag, can be received by inner surfaces of the cabin.

In an occupant protecting device for a vehicle of a third aspect, in the disclosure of the first aspect or the second aspect, a portion, which faces the first airbag, of the second airbag that is in an deployed state is depressed toward a side opposite the first airbag.

In accordance with the occupant protecting device for a vehicle of the third aspect, due to the portion, which faces the first airbag, of the second airbag being depressed toward the side opposite the first airbag, interference between the second airbag and the first airbag can be suppressed. Due thereto, the behavior at the time when the second airbag deploys can be stabilized.

In an occupant protecting device for a vehicle of a fourth aspect, in the occupant protecting device for a vehicle of any one of the first aspect through the third aspect, the vehicle seat is a driver's seat at which a steering wheel and pedals are disposed at a seat front side of the vehicle seat, and a portion, which faces the pedals, of the second airbag that is in an deployed state is depressed toward a side opposite the pedals.

In accordance with the occupant protecting device for a vehicle of the fourth aspect, due to the portion, which faces the pedals, of the second airbag being depressed toward the side opposite the pedals, interference between the second airbag and the pedals can be suppressed.

Due thereto, the behavior at the time when the second airbag deploys can be stabilized.

In an occupant protecting device for a vehicle of a fifth aspect, in the occupant protecting device for a vehicle of any one of the first aspect through the fourth aspect, the vehicle seat has a leg placement portion that supports, from a seat lower side, the leg portions of the vehicle occupant seated in the vehicle seat, and the second airbag deploys from the leg placement portion.

In accordance with the occupant protecting device for a vehicle of the fifth aspect, due to the structure in which the second airbag deploys from the leg placement portion, the leg portions of the vehicle occupant that are placed on the leg placement portion can be restrained by the second airbag.

In an occupant protecting device for a vehicle of a sixth aspect, in the occupant protecting device for a vehicle of the fifth aspect, the first airbag deploys before the second airbag.

In accordance with the occupant protecting device for a vehicle of the sixth aspect, the first airbag deploys before the second airbag. Due thereto, the leg portions of the vehicle occupant that are apart from the leg placement portion are moved by the first airbag toward the leg placement portion side, and thereafter, the second airbag can be disposed between the first airbag and the leg portions of the vehicle occupant that are placed on the leg placement portion.

An occupant protecting device for a vehicle of a seventh aspect includes: a vehicle seat that is supported so as to be slidable in a seat front-rear direction; a leg placement portion that is provided at the vehicle seat and that supports, from a seat lower side, leg portions of a vehicle occupant seated in the vehicle seat; a foot airbag that is provided at the leg placement portion, and that, at a time of a front collision of a vehicle, in a case in which a seat front-rear direction position of the vehicle seat is disposed further toward a rear side than a predetermined position, deploys, and restrains the leg portions of the vehicle occupant seated in the vehicle seat; and a restricting member that is connected to the foot airbag and that restricts movement, toward a seat upper side, of the foot airbag that is in an deployed state.

In accordance with the occupant protecting device for a vehicle of the seventh aspect, the foot airbag deploys when the vehicle is involved in a front collision in a state in which the seat front-rear direction position of the vehicle seat is disposed further toward the rear side than a predetermined position. Further, movement, toward the seat upper side, of the foot airbag that is in an deployed state is restricted by the restricting member. Due thereto, at the time when the leg portions of the vehicle occupant seated in the vehicle seat push the foot airbag, the foot airbag moving toward the seat upper side can be suppressed. As a result, in a state in which the vehicle seat has been slid toward the seat rear side, the leg portions of the vehicle occupant seated in the vehicle seat can be restrained.

In an occupant protecting device for a vehicle of an eighth aspect, in the occupant protecting device for a vehicle of the seventh aspect, an opening portion is formed in a portion, which faces toes of the vehicle occupant that are placed on the leg placement portion, of the foot airbag.

In accordance with the occupant protecting device for a vehicle of the eighth aspect, due to the opening portion being formed in the portion of the foot airbag which portion faces the toes of the vehicle occupant that are placed on the leg placement portion, the foot airbag, and the portion that is further toward the side of the knees than the toes of the vehicle occupant that are placed on the leg placement portion, can be fit more closely together.

In an occupant protecting device for a vehicle of a ninth aspect, in the occupant protecting device for a vehicle of the seventh aspect or the eighth aspect, a side, which is opposite to a side connected to the foot airbag, of the restricting member is supported so as to be movable in the seat front-rear direction, and in a case in which the foot airbag deploys, the side, which is opposite to the side connected to the foot airbag, of the restricting member moves toward a seat rear side.

In accordance with the occupant protecting device for a vehicle of the ninth aspect, at the time when the foot airbag deploys, the side, which is opposite to the side connected to the foot airbag, of the restricting member moves toward the seat rear side. Due thereto, at the time when the foot airbag deploys, as compared with a structure in which the side, which is opposite to the side connected to the foot airbag, of the restricting member does not move toward the seat rear side, the foot airbag moving toward the seat upper side at the time when the leg portions of the vehicle occupant seated in the vehicle seat push the foot airbag can be suppressed.

An occupant protecting device for a vehicle of a tenth aspect further has, in the occupant protecting device for a vehicle of any one of the first aspect through the ninth aspect, a sensor that detects a physique of the vehicle occupant seated in the vehicle seat, wherein, in a case in which the physique of the vehicle occupant detected by the sensor is smaller than a predetermined physique, the second airbag or the foot airbag deploys in a state in which a position of the vehicle seat in the seat front-rear direction is further toward a front side than in a case in which the physique of the vehicle occupant is larger than the predetermined physique.

In accordance with the occupant protecting device for a vehicle of the tenth aspect, the second airbag or the foot airbag can be deployed more suitably in accordance with the physique of the vehicle occupant.

The occupant protecting device for a vehicle relating to the present disclosure has the effect of being able to restrain the leg portions of a vehicle occupant who is seated in a vehicle seat, in a state in which the vehicle seat has been slid toward a seat rear side.

BRIEF DESCRIPTION OF THE DRAWINGS

Embodiments will be described in detail based on the following figures, wherein:

FIG. 13 is a graph showing the front-rear position of the vehicle seat and the absence/presence of expansion of the foot airbag.

DETAILED DESCRIPTION

First Embodiment

Figure 1:
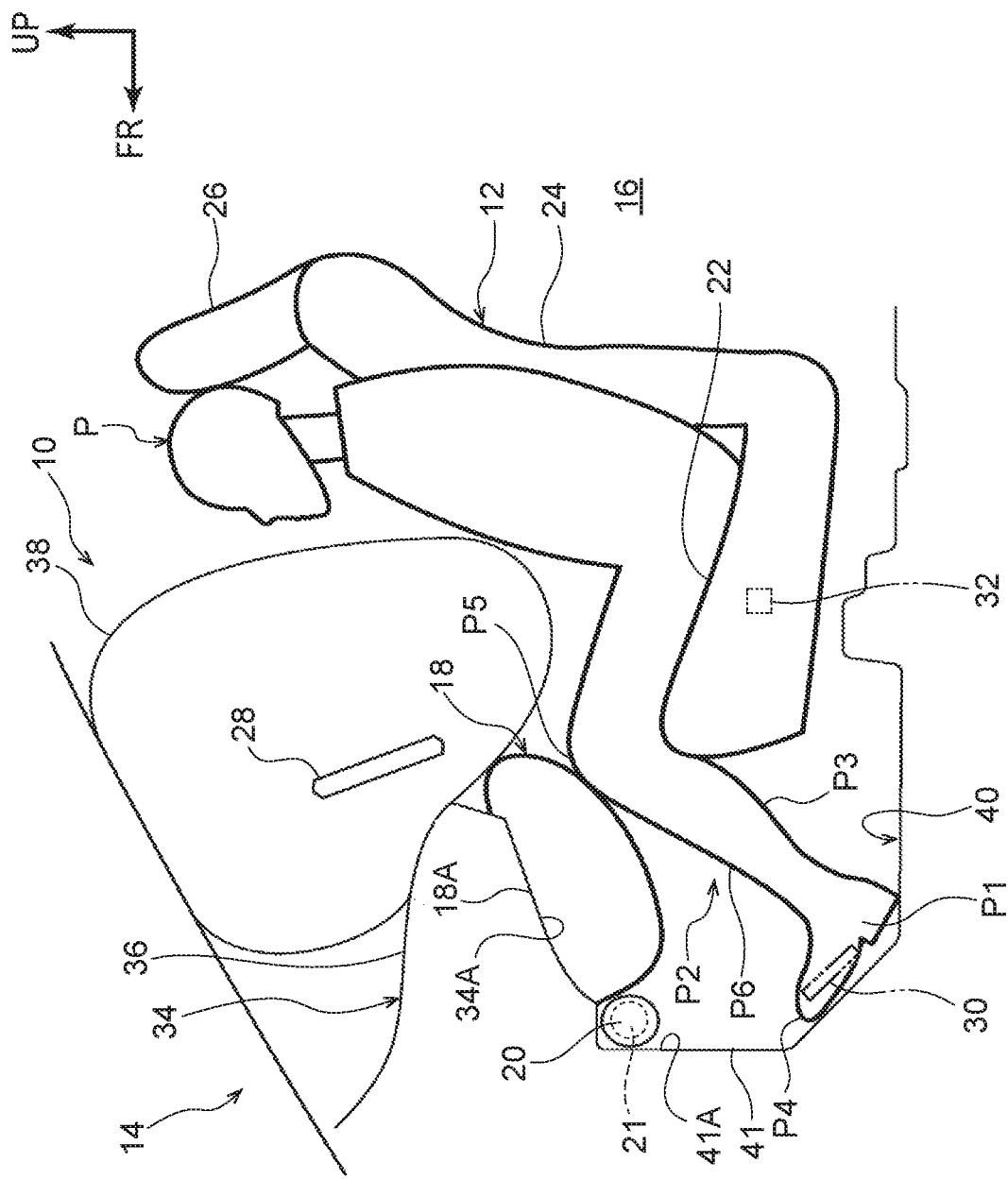
FIG. 1 is a side view showing a cabin of a vehicle that is equipped with an occupant protecting device for a vehicle of a first embodiment, and shows a state in which a knee airbag has deployed.
Figure 2:
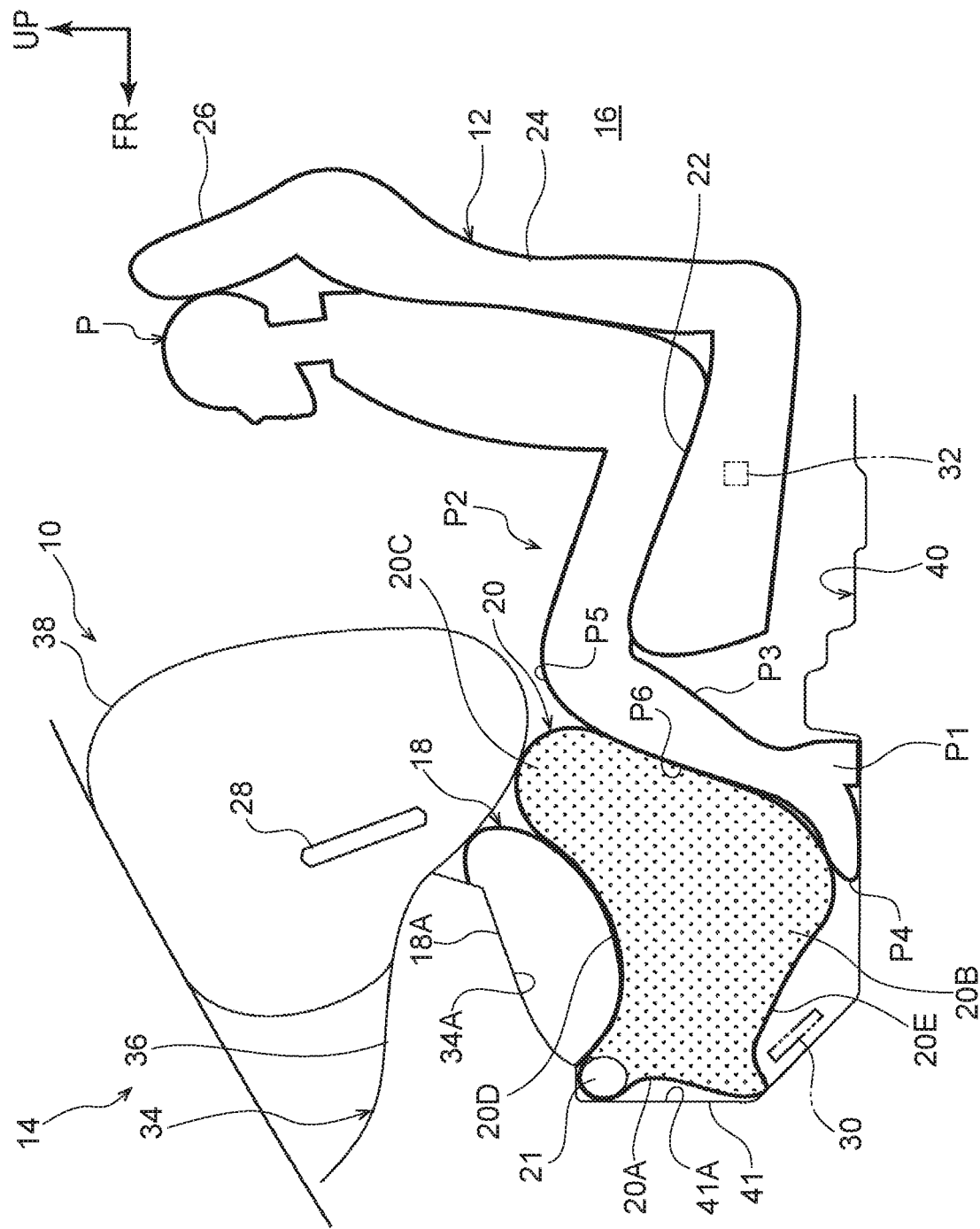
FIG. 2 is a side view showing the cabin of the vehicle that is equipped with the occupant protecting device for a vehicle of the first embodiment, and shows a state in which a knee airbag and a foot airbag have deployed.
Figure 3:
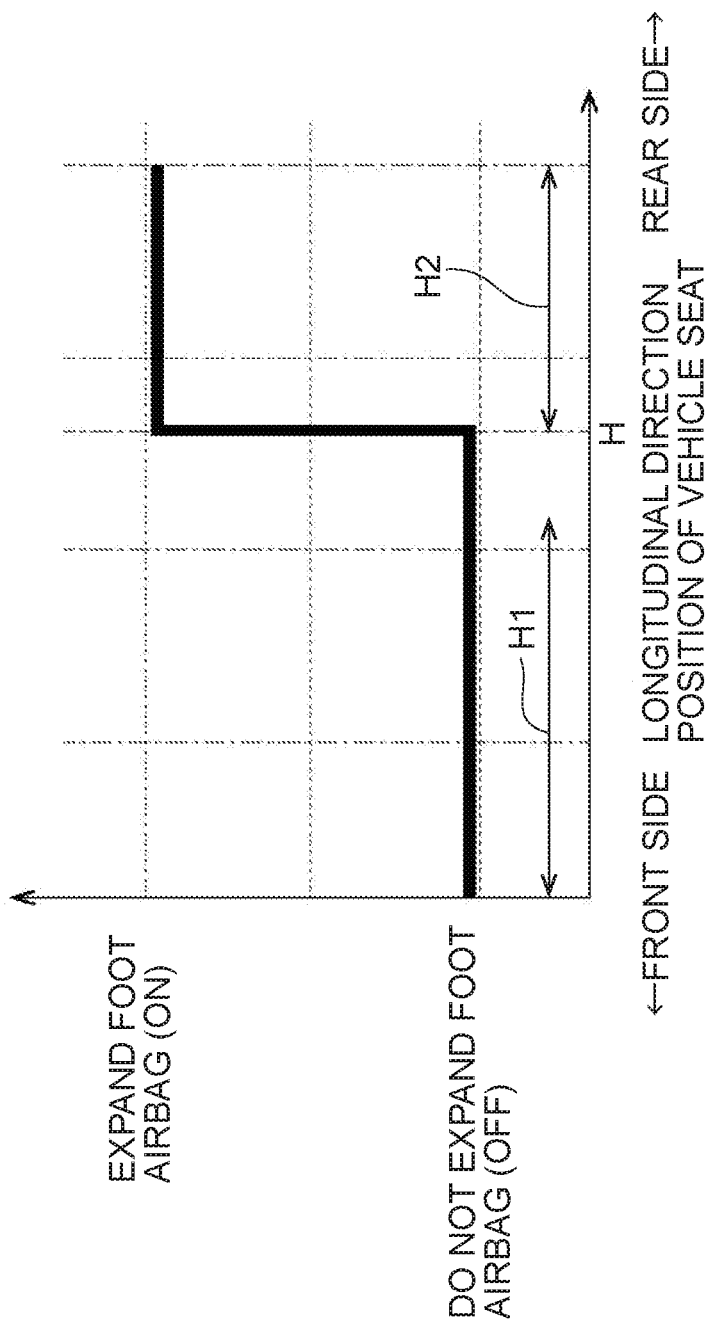
FIG. 3 is a graph showing the front-rear position of a vehicle seat and the absence/presence of expansion of the foot airbag.

An occupant protecting device 10 for a vehicle relating to a first embodiment of the present disclosure is described by using FIG. 1 through FIG. 3. Note that, in the following explanation, when description is given by using front-rear, left-right and vertical directions, they refer to the front-rear, the left-right and the vertical directions as seen from a vehicle occupant who is seated in a vehicle seat 12, unless otherwise specified. Further, arrow FR that is shown appropriately in the respective drawings indicates the seat frontward direction, arrow UP indicates the seat upward direction, arrow RH indicates the seat rightward direction, and arrow LH indicates the seat leftward direction, respectively. Further, the seat frontward direction, the seat upward direction, the seat rightward direction and the seat leftward direction respectively coincide with the frontward direction of the vehicle, the upward direction of the vehicle, the rightward direction of the vehicle and the leftward direction of the vehicle.

As shown in FIG. 1 and FIG. 2, the occupant protecting device 10 for a vehicle of the present embodiment has the vehicle seat 12 that is used as a driver's seat. This occupant protecting device 10 for a vehicle has a knee airbag 18 that serves as a first airbag and a foot airbag 20 that serves as a second airbag, which expand in a cabin 16 at the time of a front collision of a vehicle 14. Note that front collision means a full-overlap collision, an offset collision, a small overlap collision, and an oblique collision.

The vehicle seat 12 has a seat cushion 22 that supports the buttocks of a vehicle occupant P, a seatback 24 that supports the upper body of the vehicle occupant P, and a headrest 26 that supports the head portion of the vehicle occupant P. The seat cushion 22 is supported, so as to be slidable in the front-rear direction, at a floor (floor panel 40) of the cabin 16 via unillustrated seat sliding rails.

Here, the vehicle seat 12 is provided in the cabin 16 of the vehicle 14 that is a self-driving vehicle. Therefore, the vehicle seat 12 can be slid in the front-rear direction from a position at which the vehicle occupant P who is seated in that vehicle seat 12 can operate a steering wheel 28 and pedals 30 and the like, to a rearward position at which the vehicle occupant P cannot operate these. Note that FIG. 1 illustrates a state in which the vehicle seat 12 is disposed at a position at which the vehicle occupant P who is seated in the vehicle seat 12 can operate the steering wheel 28, the pedals 30 and the like. Further, FIG. 2 illustrates a state in which the vehicle seat 12 has been moved toward the rear side to the rearward position at which the vehicle occupant P who is seated in the vehicle seat 12 cannot operate the steering wheel 28, the pedals 30 and the like.

Further, in the present embodiment, an unillustrated position sensor that detects the position of the vehicle seat 12 in the seat front-rear direction, and a physique detecting sensor 32 that serves as a sensor that detects the physique (e.g., the body weight) of the vehicle occupant P seated in the vehicle seat 12, are provided.

The steering wheel 28 is provided at the front side of the vehicle seat 12. An instrument panel 34 and a dashboard 36 are provided at the front side of the steering wheel 28. The pedals 30 are the accelerator pedal, the brake pedal and the like that are disposed at the lower side of the instrument panel 34, and are operated by a foot P1 of the vehicle occupant P. Note that, in the present embodiment, an airbag 38, which is for restraining the upper body of the vehicle occupant who is seated in the front passenger's seat at the time of a front collision of the vehicle 14, deploys from the instrument panel 34.

The knee airbag 18 is provided within the instrument panel 34 at the front side of the vehicle seat 12. Further, at the time of a front collision to vehicle, gas is supplied from an unillustrated inflator to the interior of the knee airbag 18, and the knee airbag 18 inflates. Due thereto, the knee airbag 18 deploys toward the lower side of the instrument panel 34. Here, in the state in which the knee airbag 18 has deployed, a surface 18A, which is at the side opposite leg portions P2 of the vehicle occupant P who is seated in the vehicle seat 12, of the knee airbag 18 is disposed along a lower surface 34A of the instrument panel 34 that structures one of the inner surfaces of the cabin 16.

The foot airbag 20 is provided at the upper portion of a dash panel 41 at the front end portion of the floor panel 40 that is at the front side of the vehicle seat 12. Further, as shown in FIG. 2, at the time of a front collision of the vehicle, gas is supplied into the foot airbag 20 from an inflator 21, and the foot airbag 20 is inflated. Due thereto, the foot airbag 20 deploys between the knee airbag 18 and the leg portions P2 of the vehicle occupant P who is seated in the vehicle seat 12. Here, in the state in which the foot airbag 20 has deployed, a front surface 20A, which is at the side opposite the leg portions P2 of the vehicle occupant P seated in the vehicle seat 12, of the foot airbag 20 is disposed so as to run along a rear surface 41A that is at the upper portion of the dash panel 41 at the front end portion of the floor panel 40 and that structures one of the inner surfaces of the cabin 16. Further, in the state in which the foot airbag 20 has deployed, front-rear direction central portion 20B of the foot airbag 20 is disposed at the lower side of the knee airbag 18, and rear end portion 20C of the foot airbag 20 is disposed at the rear side of the knee airbag 18. Further, at the foot airbag 20 of the present embodiment, portion 20D, which faces the knee airbag 18 in the vertical direction in the state after expansion, is recessed toward the lower side. Moreover, at the foot airbag 20 of the present embodiment, portion 20E, which faces the pedals 30 in the vertical direction in the state after expansion, is recessed toward the upper side.

As shown in FIG. 3, in the present embodiment, the foot airbag 20 does not deploy unless there is a state in which the seat front-rear direction position of the vehicle seat 12 is disposed further toward the rear side than a predetermined position H. Concretely, the foot airbag 20 does not deploy in a state in which the vehicle seat 12 is disposed at a position at which the seated vehicle occupant P can operate the steering wheel 28, the pedals 30 and the like (a state in which the vehicle seat 12 is disposed in range H1 in which the posture at which the vehicle occupant P carries out the driving operations is adjusted in accordance with the physique of the vehicle occupant P). In contrast, the foot airbag 20 deploys in a state in which the vehicle seat 12 is disposed at a position at which the vehicle occupant P can sit without operating the steering wheel 28, the pedals 30 and the like (a state in which the vehicle seat 12 is disposed in a range H2 at which the vehicle occupant P does not carry out driving operations). Note that the above-described position H, which is the threshold value for judging whether or not the foot airbag 20 is to be deployed, is determined in consideration of standard physiques and the like of the vehicle occupants P of the country in which the vehicle 14 is sold. Further, as shown in FIG. 3, it is good to provide a range in which the vehicle seat 12 is not locked, between the range H1, in which the posture at which the vehicle occupant P carries out the driving operations is adjusted in accordance with the physique of the vehicle occupant P, and the range H2 in which the vehicle occupant P does not carry out driving operations.

Operation and Effects of Present Embodiment

Operation and effects of the present embodiment are described next.

As shown in FIG. 1 and FIG. 3, in the state in which the vehicle seat 12 is disposed at a position at which the seated vehicle occupant P can operate the steering wheel 28, the pedals 30 and the like, if the vehicle 14 is involved in a front collision, the knee airbag 18 deploys toward the lower side of the instrument panel 34. Due thereto, the leg portions P2 of the vehicle occupant P seated in the vehicles seat 12 can be restrained by the knee airbag 18. As a result, the occurrence of a phenomenon in which the vehicle occupant P seated in the vehicle seat 12 slides toward the seat front side along the seat cushion 22 (the so-called "submarine phenomenon") can be effectively suppressed.

Further, as shown in FIG. 2 and FIG. 3, in a state in which the vehicle seat 12 is disposed at a rearward position at which the vehicle occupant P can sit without operating the steering wheel 28, the pedals 30 and the like, if the vehicle 14 is involved in a front collision, the knee airbag 18 deploys toward the lower side of the instrument panel 34, and the foot airbag 20 deploys between the knee airbag 18 and the leg portions P2 of the vehicle occupant P who is seated in the vehicle seat 12. Due thereto, the leg portions P2 of the vehicle occupant P seated in the vehicle seat 12 can be restrained by the knee airbag 18 and the foot airbag 20. In this way, in the present embodiment, in the state in which the vehicle seat 12 is slid toward the seat rear side, the leg portions P2 of the vehicle occupant P who is seated in the vehicle seat 12 can be restrained. Due thereto, the occurrence of the submarine phenomenon can be effectively suppressed also in a state in which the vehicle seat 12 has been slid toward the seat rear side.

Further, in the present embodiment, at the knee airbag 18 that has been deployed, the surface 18A, which is at the side opposite the leg portions P2 of the vehicle occupant P who is seated in the vehicle seat 12, is disposed along the lower surface 34A of the instrument panel 34. In addition, at the foot airbag 20 that has been deployed, the front surface 20A, which is at the side opposite the leg portions P2 of the vehicle occupant P who is seated in the vehicle seat 12, is disposed along the rear surface 41A of the upper portion of the dash panel 41 at the front end portion of the floor panel 40. Due thereto, some of the load, which is inputted from the leg portions P2 of the vehicle occupant P to the foot airbag 20, can, via the knee airbag 18, be received by the lower surface 34A of the instrument panel 34. Another portion of the load, which is inputted from the leg portions P2 of the vehicle occupant P to the foot airbag 20, can be received by the rear surface 41A at the upper portion of the dash panel 41 at the front end portion of the floor panel 40.

Moreover, in the present embodiment, at the foot airbag 20 that has been deployed, the portion 20D that faces the knee airbag 18 in the vertical direction is recessed toward the lower side. Further, at the foot airbag 20 that has been deployed, the portion 20E that faces the pedals 30 in the vertical direction is recessed toward the upper side. Due thereto, at the time when the foot airbag 20 deploys, the foot airbag 20 interfering with the knee airbag 18 and the pedals 30 can be suppressed. As a result, the behavior at the time when the foot airbag 20 deploys can be stabilized.

Second Embodiment

Figure 4:
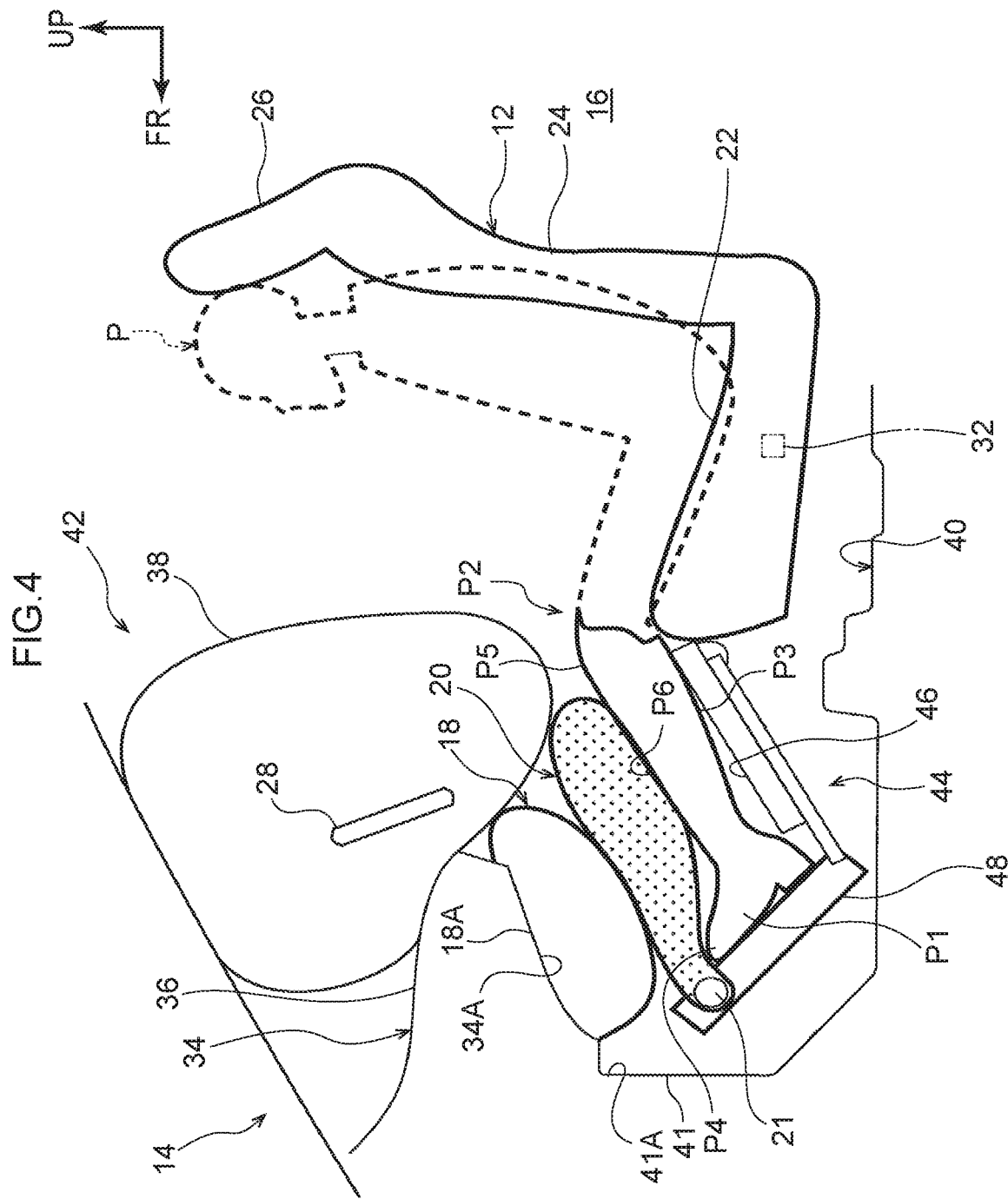
FIG. 4 is a side view showing the cabin of the vehicle that is equipped with an occupant protecting device for a vehicle of a second embodiment, and shows a state in which the knee airbag and the foot airbag have deployed.
Figure 5:
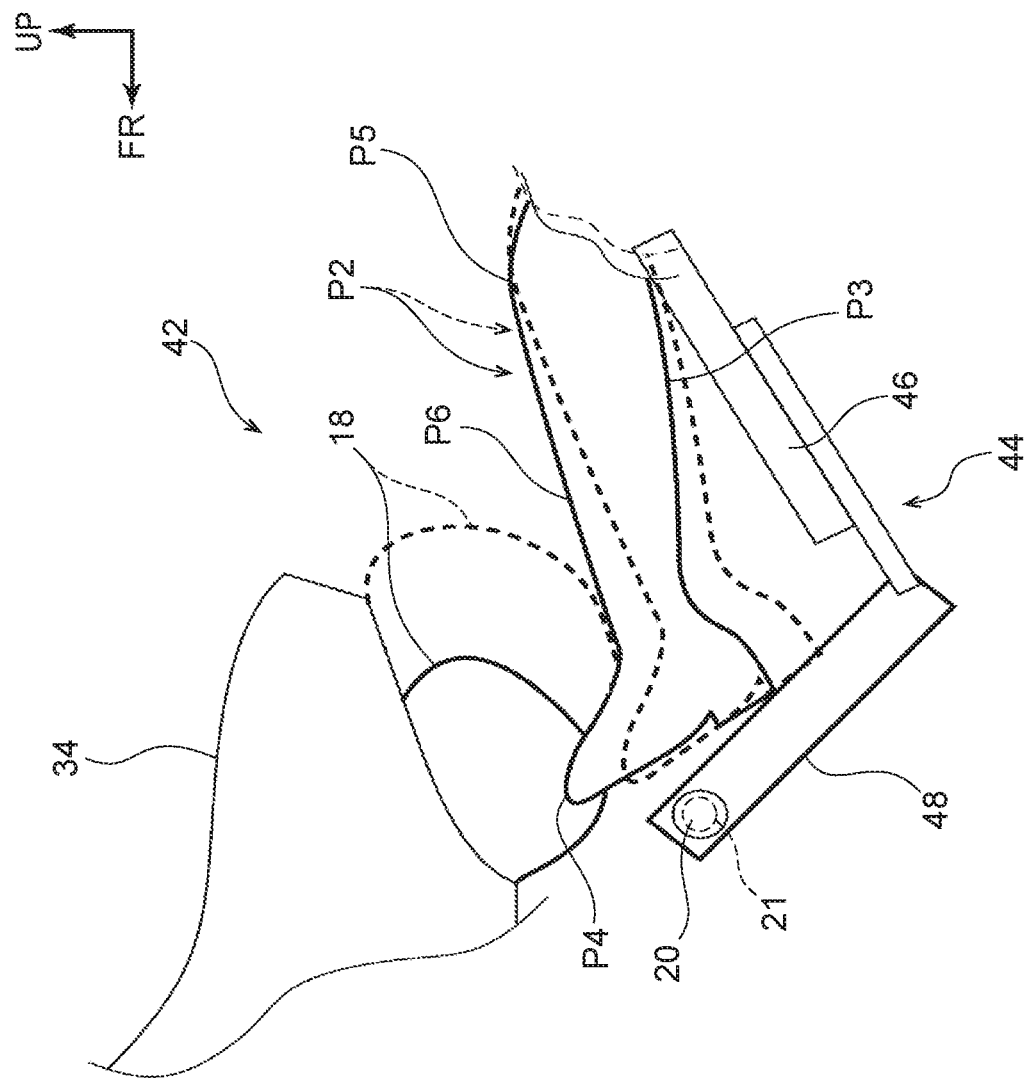
FIG. 5 is a side view showing the expansion of the knee airbag that is shown in FIG. 4.
Figure 6:
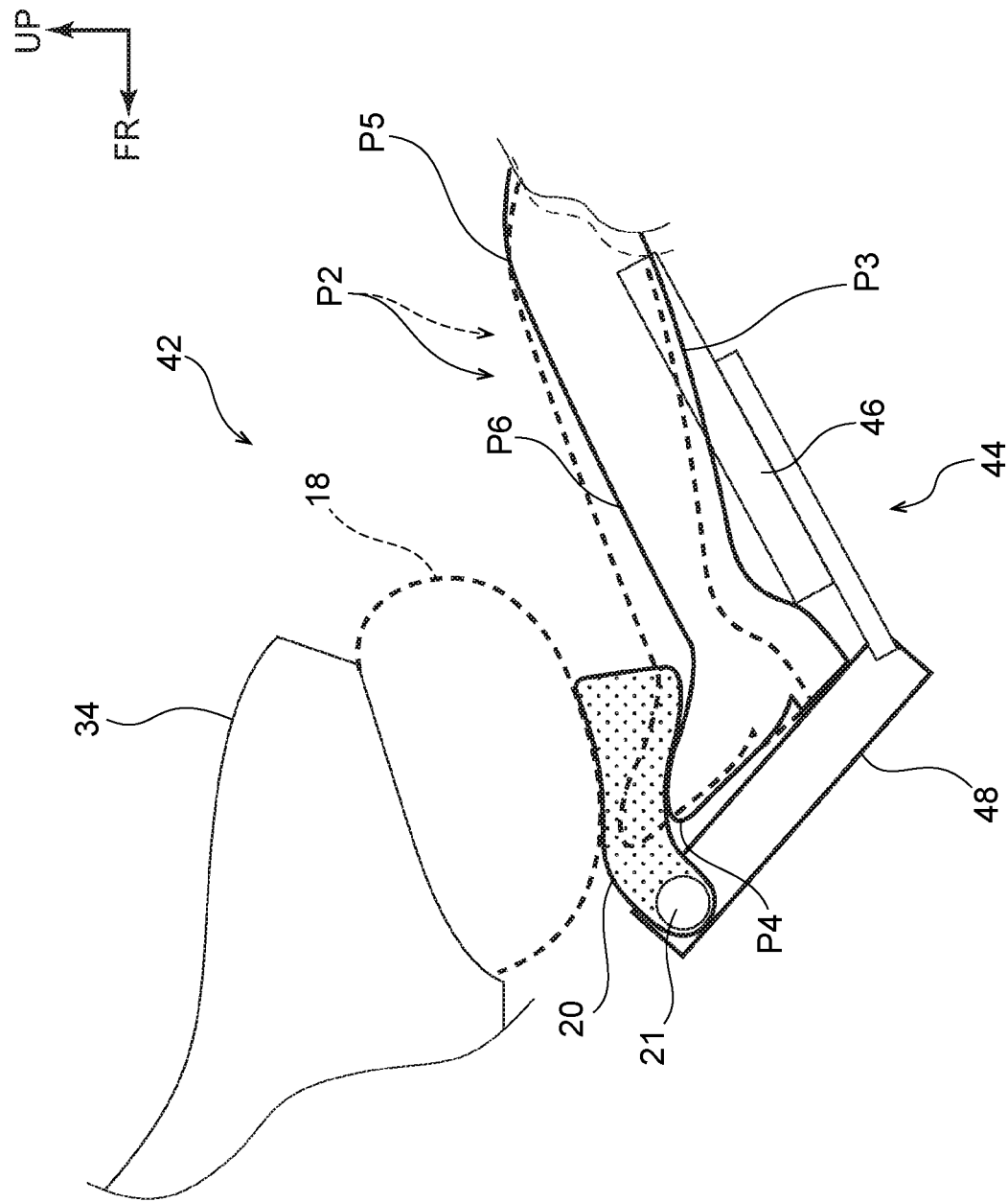
FIG. 6 is a side view showing the initial stage of expansion of the foot airbag that is shown in FIG. 4.

An occupant protecting device 42 for a vehicle relating to a second embodiment of the present disclosure is described by using FIG. 4 through FIG. 6. Note that, at the occupant protecting device 42 for a vehicle of the present embodiment, members and portions that correspond to those of the occupant protecting device 10 for a vehicle of the above-described first embodiment are denoted by the same reference numerals as the corresponding members and portions of the occupant protecting device 10 for a vehicle, and there are cases in which description thereof is omitted.

As shown in FIG. 4, the occupant protecting device 42 for a vehicle of the present embodiment has an ottoman device 44 that serves as a leg placement portion, and has the feature that the foot airbag 20 is provided at a footrest portion 48 that structures a portion of the ottoman device 44.

The ottoman device 44 has an ottoman main body portion 46 that unfolds toward the front side from the distal end portion of the seat cushion 22 and supports, from the rear side and the lower side, calves P3 of the leg portions P2 of the vehicle occupant P who is seated in the vehicle seat 12. Further, the ottoman device 44 has the footrest portion 48 that is mounted to the front end portion of the ottoman main body portion 46 and supports, from the rear side and the lower side, the feet P1 of the leg portions P2 of the vehicle occupant P who is seated in the vehicle seat 12. Further, in the present embodiment, the foot airbag 20 deploys from the front end portion (the upper end portion) of the footrest portion 48. In the present embodiment, the knee airbag 18 deploys before the foot airbag 20.

In accordance with the above-described present embodiment, when the vehicle 14 is involved in a front collision in the state in which the vehicle seat 12 is disposed at the rearward position at which the vehicle occupant P can sit without operating the steering wheel 28 and the pedals 30 and the like, and in the state in which the leg portions P2 of the vehicle occupant P are supported by the ottoman main body portion 46 and the footrest portion 48 of the ottoman device 44, the knee airbag 18 deploys toward the lower side of the instrument panel 34, and the foot airbag 20 deploys from the footrest portion 48. Due thereto, the leg portions P2 of the vehicle occupant P who is seated in the vehicle seat 12 can be restrained by the foot airbag 20.

Here, in the present embodiment, the knee airbag 18 deploys before the foot airbag 20. Due thereto, the leg portions P2 of the vehicle occupant P that are apart from the ottoman main body portion 46 as shown by the solid line in FIG. 5 are moved by the knee airbag 18 toward the ottoman main body portion 46 side as shown by the dashed line, and a gap is formed between the leg portions P2 of the vehicle occupant P and the knee airbag 18. Thereafter, as shown in FIG. 6, the foot airbag 20 can be disposed between the knee airbag 18 and the leg portions P2 of the vehicle occupant P that are placed on the ottoman main body portion 46 and the footrest portion 48.

Third Embodiment

An occupant protecting device 50 for a vehicle relating to a third embodiment of the present disclosure is described by using FIG. 7 through FIG. 10. Note that, at the occupant protecting device 50 for a vehicle of the present embodiment, members and portions that correspond to those of the occupant protecting device 42 for a vehicle of the above-described second embodiment and the like are denoted by the same reference numerals as the corresponding members and portions of the occupant protecting device 42 for a vehicle, and there are cases in which description thereof is omitted.

Figure 7:
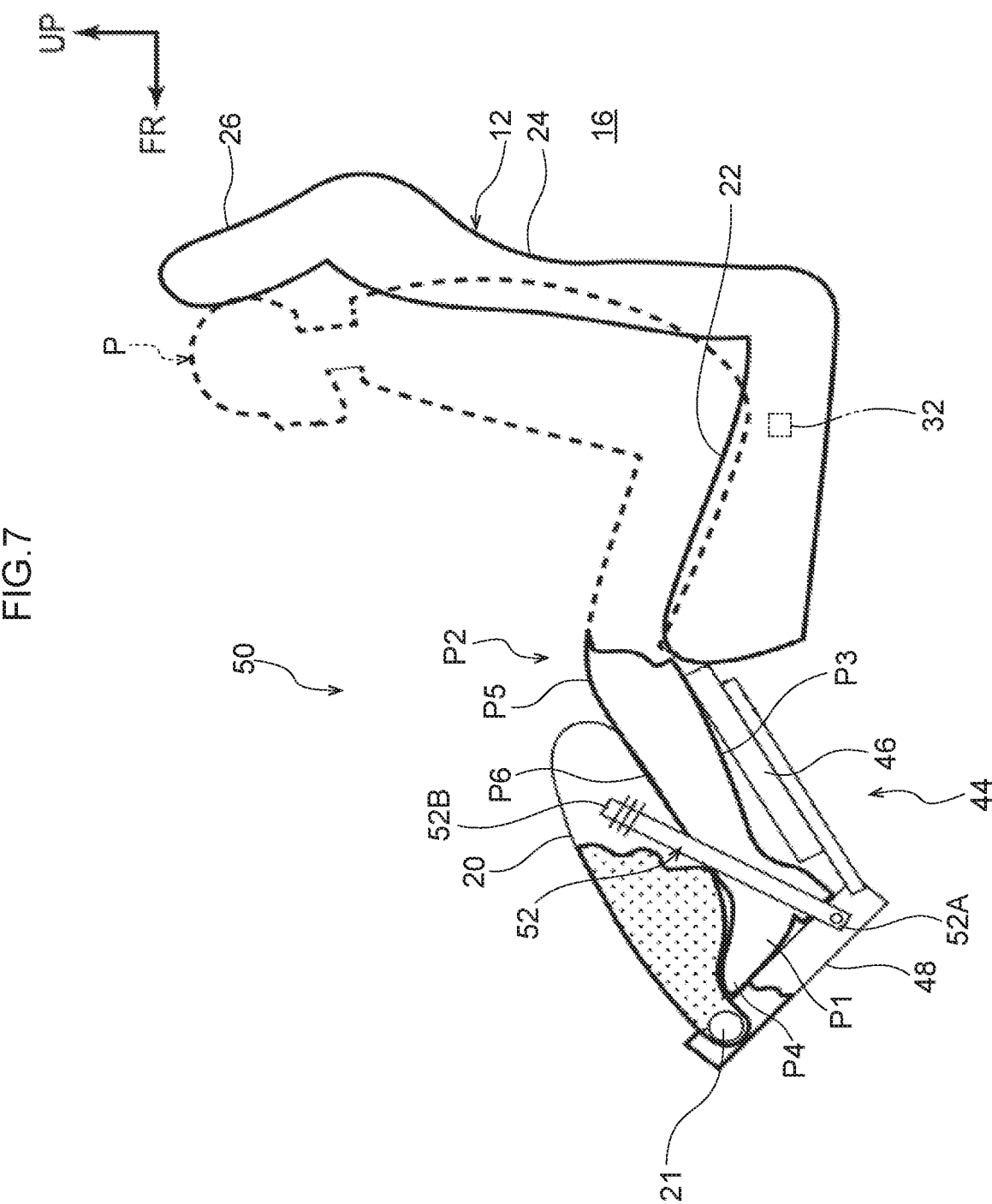
FIG. 7 is a side view showing the cabin of the vehicle that is equipped with the occupant protecting device for a vehicle of a third embodiment, and shows a state in which the foot airbag has deployed.

As shown in FIG. 7, the occupant protecting device 50 for a vehicle of the present embodiment has the feature of having a pair of left and right straps 52 that serve as restricting members that restrict movement, toward the upper side, of the foot airbag 20 that is in an deployed state. Note that the occupant protecting device 50 for a vehicle of the present embodiment does not have the knee airbag 18 (see FIG. 4).

The straps 52 are formed in the shapes of belts by using a material that is similar to that of the foot airbag 20. One side end portion 52A of one of the straps 52 is connected to the lower end portion of the left side of the footrest portion 48, and another side end portion 52B of the one strap 52 is connected to the rear end side at the left side of the foot airbag 20 that is in an deployed state. Further, although not illustrated, the one side end portion 52A of the another strap 52 is connected to the lower end portion of the right side of the footrest portion 48, and the another side end portion 52B of the another strap 52 is connected to the rear end side at the right side of the foot airbag 20 that is in an deployed state.

In the above-described present embodiment, when the vehicle 14 is involved in a front collision in the state in which the vehicle seat 12 is disposed at the rearward position at which the vehicle occupant P can sit without operating the steering wheel 28 and the pedals 30 and the like, and in the state in which the leg portions P2 of the vehicle occupant P are supported by the ottoman main body portion 46 and the footrest portion 48 of the ottoman device 44, the foot airbag 20 deploys from the footrest portion 48.

Figure 8:
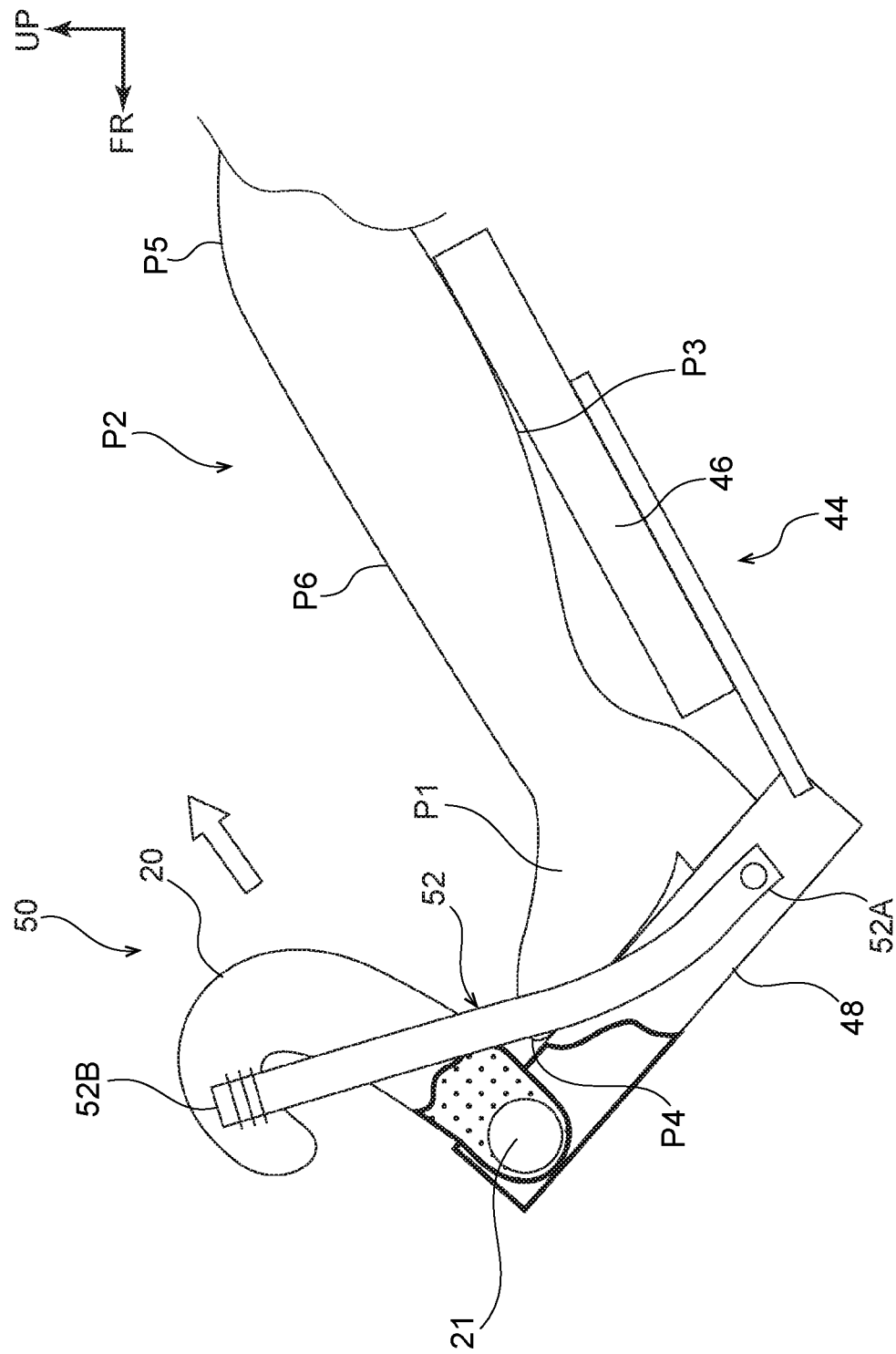
FIG. 8 is an enlarged side view of main portions showing the initial stage of expansion of the foot airbag shown in FIG. 7.
Figure 9:
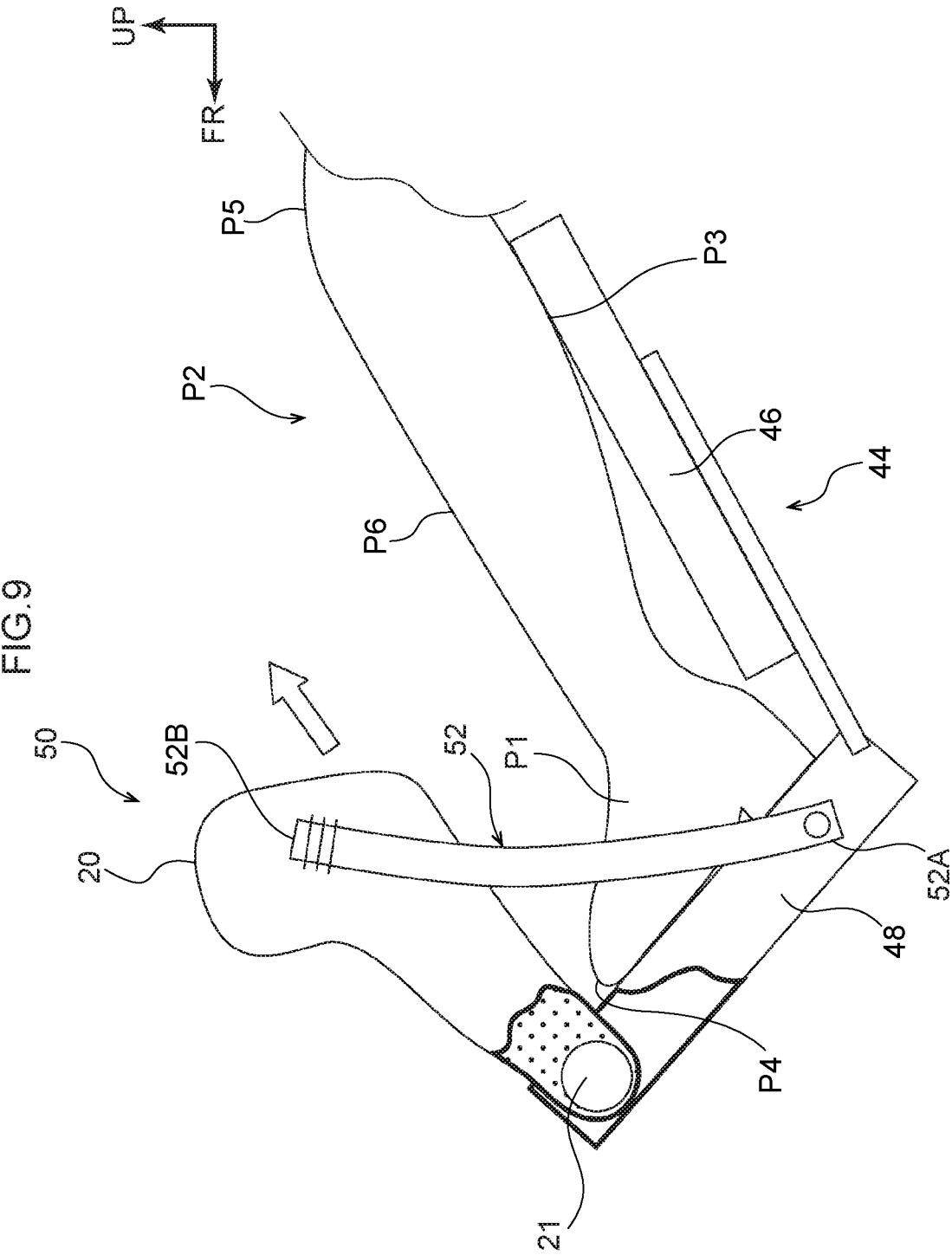
FIG. 9 is an enlarged side view of main portions showing an intermediate stage of expansion of the foot airbag shown in FIG. 7.

Here, in the present embodiment, the pair of left and right straps 52 are provided. Therefore, as shown in FIG. 8, FIG. 9 and FIG. 10, the foot airbag 20 can be expanded while swaying of the portions, to which the straps 52 are connected, of the foot airbag 20 is suppressed.

Figure 10:
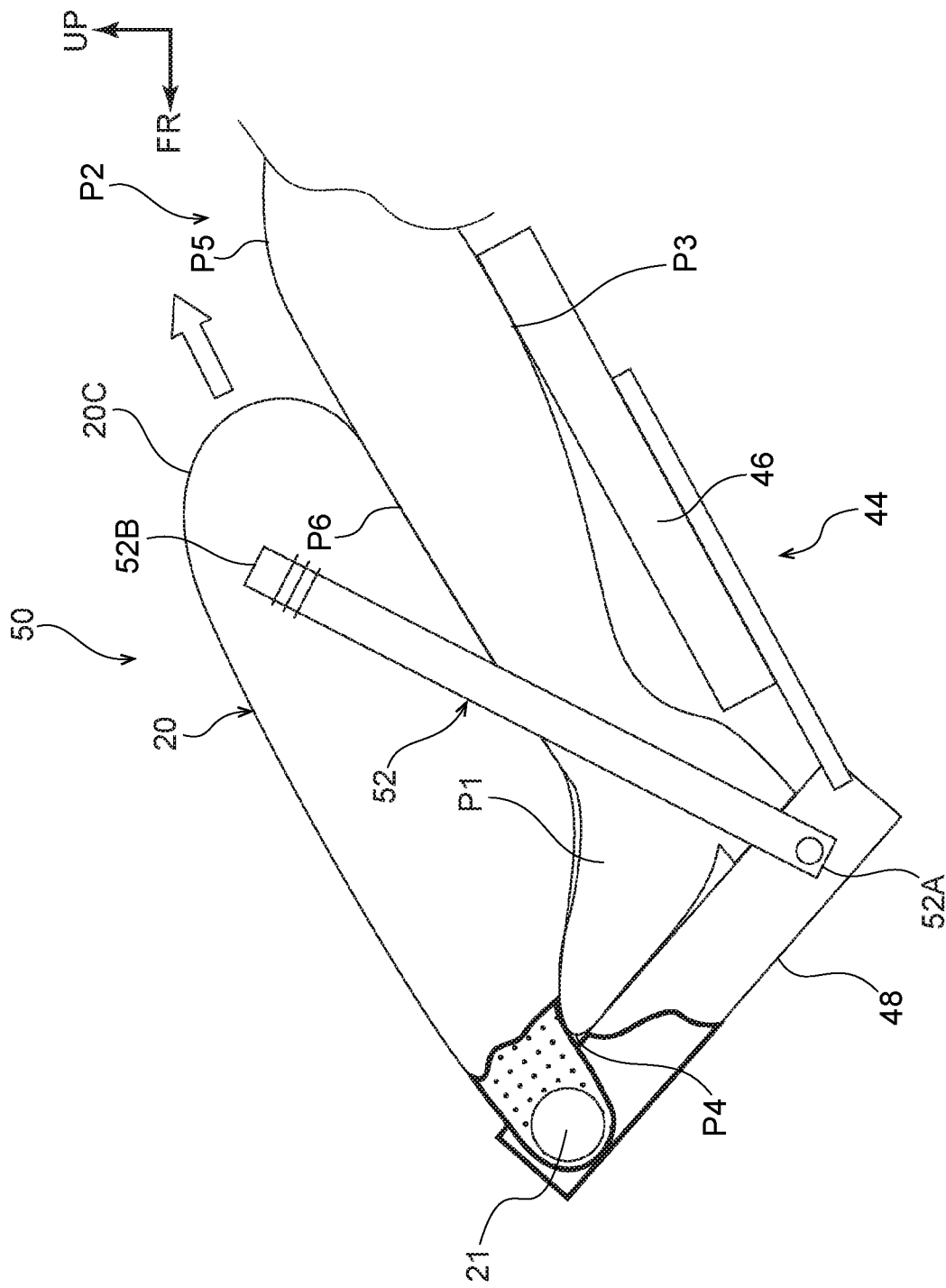
FIG. 10 is an enlarged side view of main portions showing a time when expansion of the foot airbag shown in FIG. 7 has been completed.

Further, as shown in FIG. 7 and FIG. 10, movement of the deployed foot airbag 20 toward the upper side is restricted by the straps 52. Therefore, at the time when the leg portions P2 of the vehicle occupant P who is seated in the vehicle seat 12 push the foot airbag 20, the foot airbag 20 moving toward the seat upper side can be suppressed. As a result, the leg portions P2 of the vehicle occupant P who is seated in the vehicle seat 12 can be restrained in the state in which the vehicle seat 12 has been slid toward the seat rear side.

Fourth Embodiment

Figure 11:
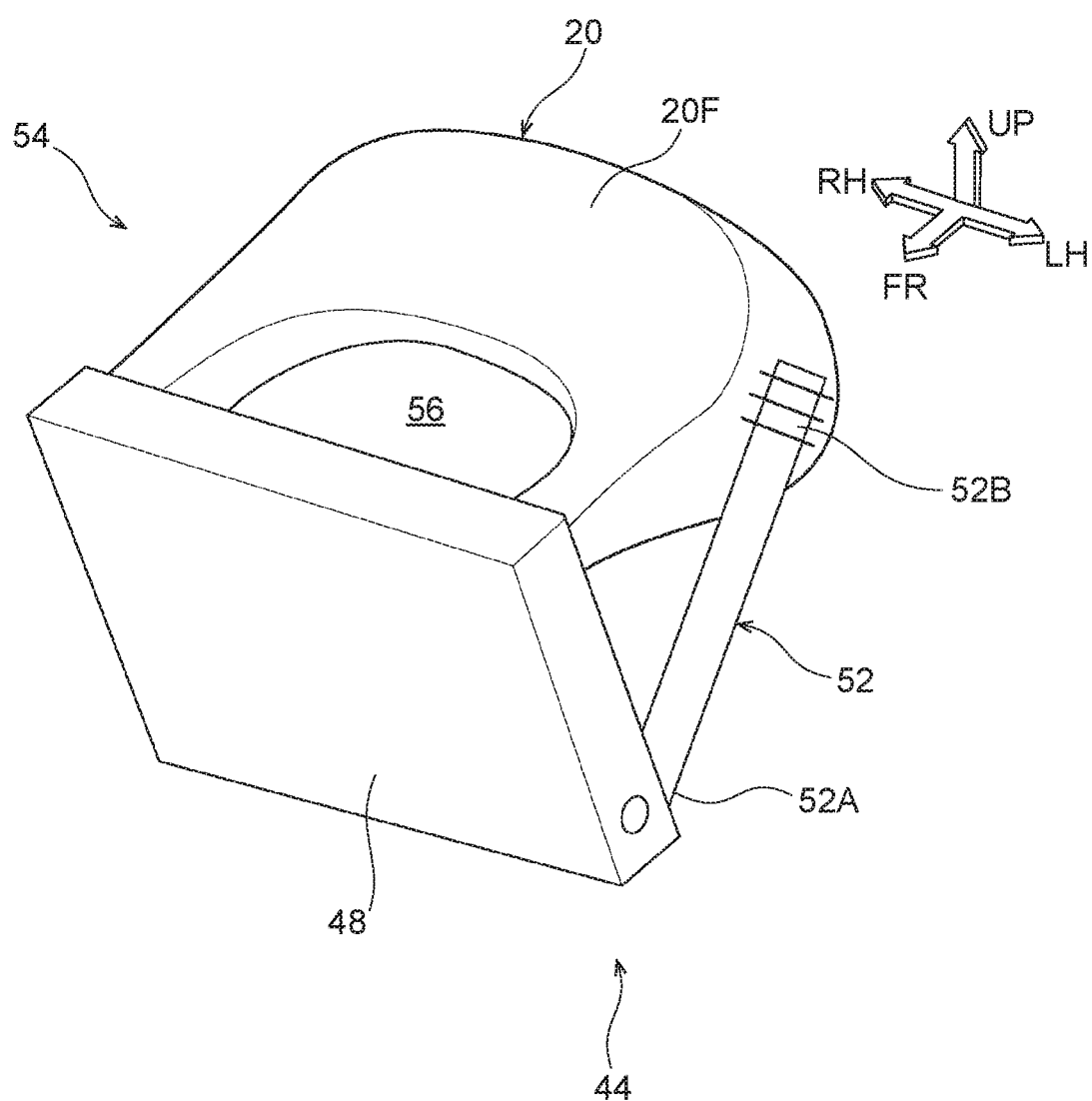
FIG. 11 is a perspective view showing a footrest, the foot airbag and the like that structure portions of an occupant protecting device for a vehicle of a fourth embodiment, and shows a state in which the foot airbag has deployed.

An occupant protecting device 54 for a vehicle relating to a fourth embodiment of the present disclosure is described by using FIG. 11. Note that, at the occupant protecting device 54 for a vehicle of the present embodiment, members and portions that correspond to those of the occupant protecting device 50 for a vehicle of the above-described third embodiment and the like are denoted by the same reference numerals as the corresponding members and portions of the occupant protecting device 50 for a vehicle, and there are cases in which description thereof is omitted.

As shown in FIG. 11, the occupant protecting device 54 for a vehicle relating to the present embodiment has the feature that an opening portion 56 is formed in the foot airbag 20 that has been deployed, in the portion thereof that faces toes P4 (see FIG. 7) at leg portions P2 of the vehicle occupant P that are placed on the footrest portion 48.

In the above-described present embodiment, at the time when the foot airbag 20 deploys, the toes P4 (see FIG. 7) of the vehicle occupant P that are placed on the footrest portion 48 can be disposed within the opening portion 56 that is formed in the foot airbag 20. Namely, the foot airbag 20 can be deployed so as to avoid the toes P4 of the vehicle occupant P that are placed on the footrest portion 48. Due thereto, at the time when the foot airbag 20 deploys, a rear side 20F, which is a portion that is further toward the rear side than the region where the opening portion 56 is formed, at the foot airbag 20 can be made to fit closely to portions (shins P6 (see FIG. 7)) that are further toward the side of the knees P5 than the toes P4 at the leg portions P2 of the vehicle occupant P.

Fifth Embodiment

Figure 12:
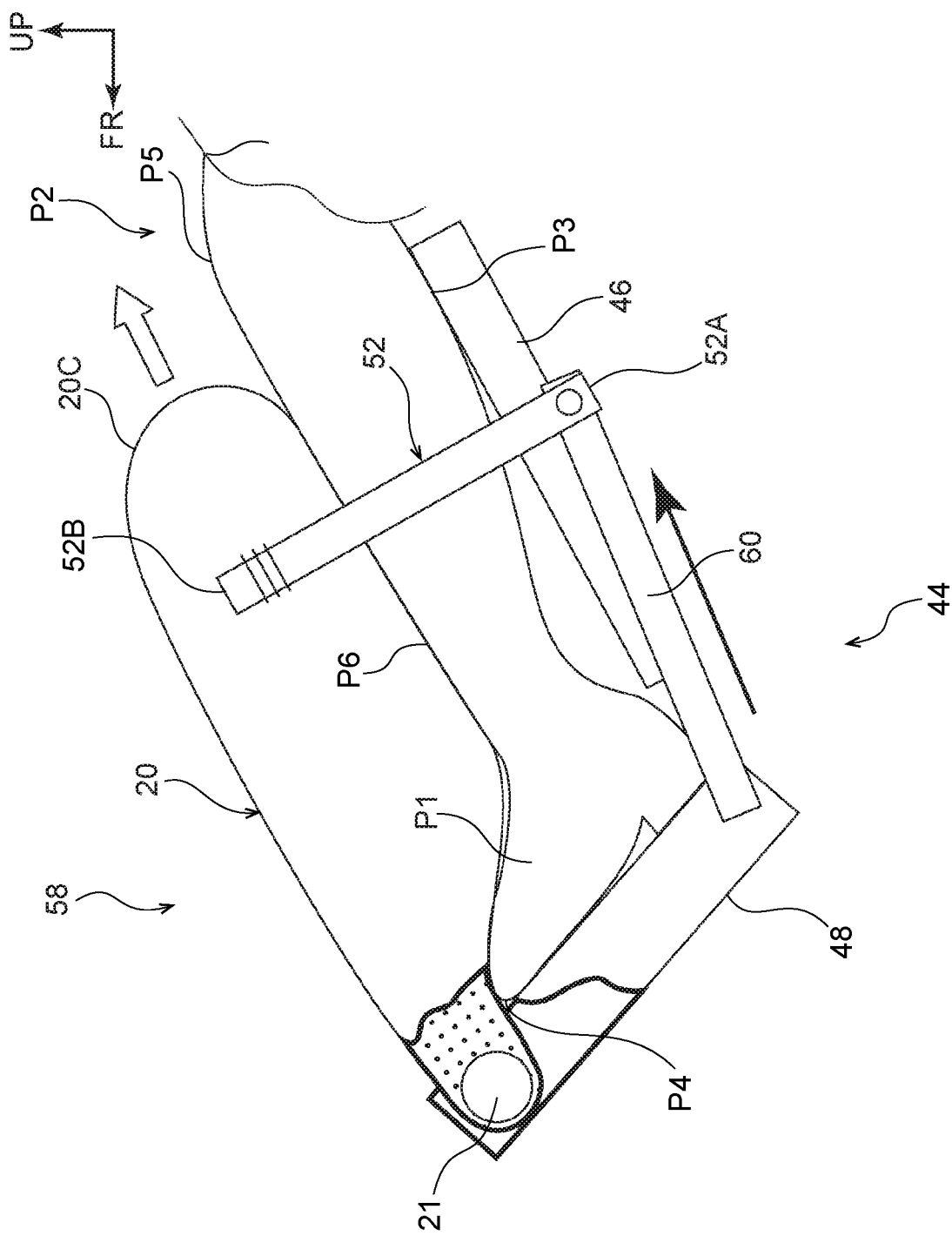
FIG. 12 is a perspective view showing the footrest, the foot airbag and the like that structure portions of an occupant protecting device for a vehicle of a fifth embodiment, and shows a state in which the foot airbag has deployed.

An occupant protecting device 58 for a vehicle relating to a fifth embodiment of the present disclosure is described by using FIG. 12. Note that, at the occupant protecting device 58 for a vehicle of the present embodiment, members and portions that correspond to those of the occupant protecting device 50 for a vehicle of the above-described third embodiment and the like are denoted by the same reference numerals as the corresponding members and portions of the occupant protecting device 50 for a vehicle, and there are cases in which description thereof is omitted.

As shown in FIG. 12, the occupant protecting device 58 for a vehicle of the present embodiment has the feature that the one side end portions 52A of the straps 52 are connected to rails 60 that are fixed to the ottoman device 44 or the like. Further, at the time when the foot airbag 20 deploys, the one side end portions 52A of the straps 52 move toward the rear side along the rails 60. Here, unillustrated one-way clutch mechanisms are provided at the rails 60. Due thereto, the one side end portions 52A of the straps 52, which have moved toward the rear side along the rails 60, do not return to the front side along the rails 60. Further, in the present embodiment, in the state in which the foot airbag 20 has deployed, the one side end portions 52A of the straps 52 are disposed further toward the rear side than the other side end portions 52B.

In the above-described present embodiment, at the time when the foot airbag 20 deploys, as compared with a structure in which the one side end portions 52A of the straps 52 do not move toward the rear side, the foot airbag 20 moving toward the seat upper side at the time when the leg portions P2 of the vehicle occupant P seated in the vehicle seat 12 push the foot airbag 20 can be suppressed.

The structures of the above-described respective embodiments can also be applied to the front side of the vehicle seat 12 that is used as the front passenger's seat.

Further, the above-described respective embodiments describe examples in which the position H (see FIG. 3) of the vehicle seat 12, that is the threshold value for judging whether or not the foot airbag 20 is to be deployed, is made to be the fixed position. However, the present disclosure is not limited to this. For example, as shown in FIG. 13, the present disclosure may be structured such that, in a case in which it is judged that the physique of the vehicle occupant P detected by the physique detecting sensor 32 (see FIG. 1) is smaller than a predetermined physique (shown by dashed line L1 in FIG. 13), the foot airbag 20 is deployed in a state in which the front-rear position of the vehicle seat 12 is located further toward the front side than in a case of a vehicle occupant of a build larger than the predetermined physique (shown by solid line L2 in FIG. 13). In this structure, the foot airbag 20 can be deployed more suitably in accordance with the physique of the vehicle occupant P. Note that reference numeral H3 is a range in which the posture of carrying out the driving operations is adjusted in accordance with the physique of the vehicle occupant P of a small build, and reference numeral H4 is a range in which the vehicle occupant P of a small build does not carry out driving operations.

Although embodiments of the present disclosure have been described above, the present disclosure is not limited to the above, and, of course, can be implemented by being modified in various ways other than the above within a scope that does not depart from the gist thereof.

What is claimed is:

1. An occupant protecting device for a vehicle, comprising:
    a vehicle seat that is supported so as to be slidable in a seat front-rear direction, the vehicle seat has a leg placement portion that supports, from a seat lower side, the leg portions of a vehicle occupant seated in the vehicle seat;
    a first airbag that is disposed at a seat front side of the vehicle seat, and that, at a time of a front collision of a vehicle, deploys, and restrains leg portions of the vehicle occupant seated in the vehicle seat; and
    a second airbag that is disposed at the seat front side of the vehicle seat, and that, at a time of a front collision of the vehicle, in a case in which a seat front-rear direction position of the vehicle seat is disposed further toward a rear side than a predetermined position, deploys from the leg placement portion and between the first airbag and the leg portions of the vehicle occupant seated in the vehicle seat, and restrains the leg portions of the vehicle occupant seated in the vehicle seat.

2. The occupant protecting device for a vehicle of claim 1, wherein sides, which are opposite the leg portions of the vehicle occupant seated in the vehicle seat, of the first airbag and the second airbag deploy along inner surfaces of a cabin.

3. The occupant protecting device for a vehicle of claim 1, wherein a portion, which faces the first airbag, of the second airbag that is in a deployed state is depressed toward a side opposite the first airbag.

4. The occupant protecting device for a vehicle of claim 1, wherein:
    the vehicle seat is a driver's seat at which a steering wheel and pedals are disposed at a seat front side of the vehicle seat, and
    a portion, which faces the pedals, of the second airbag that is in a deployed state is depressed toward a side opposite the pedals.

5. The occupant protecting device for a vehicle of claim 1, wherein the first airbag deploys before the second airbag.

6. The occupant protecting device for a vehicle of claim 1, further comprising a sensor that detects a physique of the vehicle occupant seated in the vehicle seat,
    wherein, in a case in which the physique of the vehicle occupant detected by the sensor is smaller than a predetermined physique, the second airbag deploys in a state in which a position of the vehicle seat in the seat front-rear direction is further toward a front side than in a case in which the physique of the vehicle occupant is larger than the predetermined physique.

7. The occupant protecting device for a vehicle of claim 1, wherein the leg placement portion extends from an end portion of the vehicle seat.

8. An occupant protecting device for a vehicle, comprising:
    a vehicle seat that is supported so as to be slidable in a seat front-rear direction;
    a leg placement portion that is provided at the vehicle seat and that supports, from a seat lower side, leg portions of a vehicle occupant seated in the vehicle seat;
    a foot airbag that is provided at the leg placement portion, and that, at a time of a front collision of a vehicle, in a case in which a seat front-rear direction position of the vehicle seat is disposed further toward a rear side than a predetermined position, deploys, and restrains the leg portions of the vehicle occupant seated in the vehicle seat; and
    a restricting member that is connected to the foot airbag and that restricts movement, toward a seat upper side, of the foot airbag that is in a deployed state.

9. The occupant protecting device for a vehicle of claim 8, wherein an opening portion is formed in a portion, which faces toes of the vehicle occupant that are placed on the leg placement portion, of the foot airbag.

10. The occupant protecting device for a vehicle of claim 8, wherein:
    a side, which is opposite to a side connected to the foot airbag, of the restricting member is supported so as to be movable in the seat front-rear direction, and
    in a case in which the foot airbag deploys, the side, which is opposite to the side connected to the foot airbag, of the restricting member moves toward a seat rear side.

11. The occupant protecting device for a vehicle of claim 8, further comprising a sensor that detects a physique of the vehicle occupant seated in the vehicle seat,
    wherein, in a case in which the physique of the vehicle occupant detected by the sensor is smaller than a predetermined physique, the foot airbag deploys in a state in which a position of the vehicle seat in the seat front-rear direction is further toward a front side than in a case in which the physique of the vehicle occupant is larger than the predetermined physique.

12. The occupant protecting device for a vehicle of claim 8, wherein, in a state in which the foot airbag is deployed, one side end portion of the restricting member connected to the leg placement portion is disposed further toward a rear side than an opposite side end portion of the restricting member connected to the foot airbag.

13. An occupant protecting device for a vehicle, comprising:
- a vehicle seat that is supported so as to be slidable in a seat front-rear direction;
- a first airbag that is disposed at a seat front side of the vehicle seat, and that, at a time of a front collision of a vehicle, deploys, and restrains leg portions of a vehicle occupant seated in the vehicle seat; and
- a second airbag that is disposed at the seat front side of the vehicle seat, and that, at a time of a front collision of the vehicle, in a case in which a seat front-rear direction position of the vehicle seat is disposed further toward a rear side than a predetermined position, deploys between the first airbag and the leg portions of the vehicle occupant seated in the vehicle seat, and restrains the leg portions of the vehicle occupant seated in the vehicle seat,
- wherein, in a state in which the second airbag is deployed, a front-rear direction central portion of the second airbag is disposed at a lower side of the first airbag, and a rear end portion of the second airbag is disposed at a rear side of the first airbag.

14. The occupant protecting device for a vehicle of claim 13, wherein sides, which are opposite the leg portions of the vehicle occupant seated in the vehicle seat, of the first airbag and the second airbag deploy along inner surfaces of a cabin.

15. The occupant protecting device for a vehicle of claim 13, wherein a portion, which faces the first airbag, of the second airbag that is in a deployed state is depressed toward a side opposite the first airbag.

16. The occupant protecting device for a vehicle of claim 13, wherein:
- the vehicle seat is a driver's seat at which a steering wheel and pedals are disposed at a seat front side of the vehicle seat, and
- a portion, which faces the pedals, of the second airbag that is in a deployed state is depressed toward a side opposite the pedals.

17. The occupant protecting device for a vehicle of claim 13, wherein:
- the vehicle seat has a leg placement portion that supports, from a seat lower side, the leg portions of the vehicle occupant seated in the vehicle seat, and
- the second airbag deploys from the leg placement portion.

18. The occupant protecting device for a vehicle of claim 17, wherein the first airbag deploys before the second airbag.

* * * * *